Figure 5:
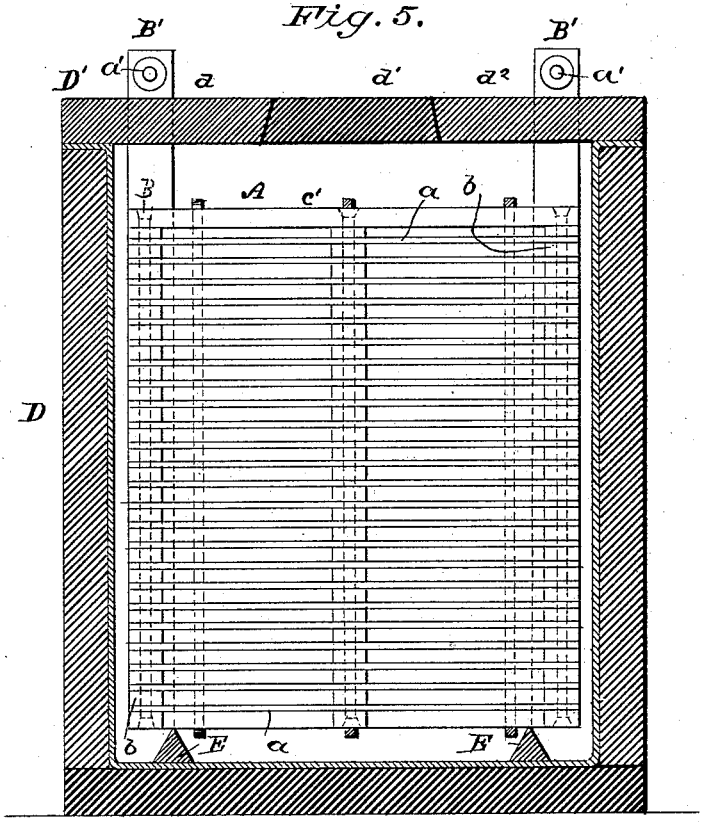

(No Model.)
E. T. STARR.
SECONDARY BATTERY OR ELECTRIC ACCUMULATOR.
No. 314,892. Patented Mar. 31, 1885.
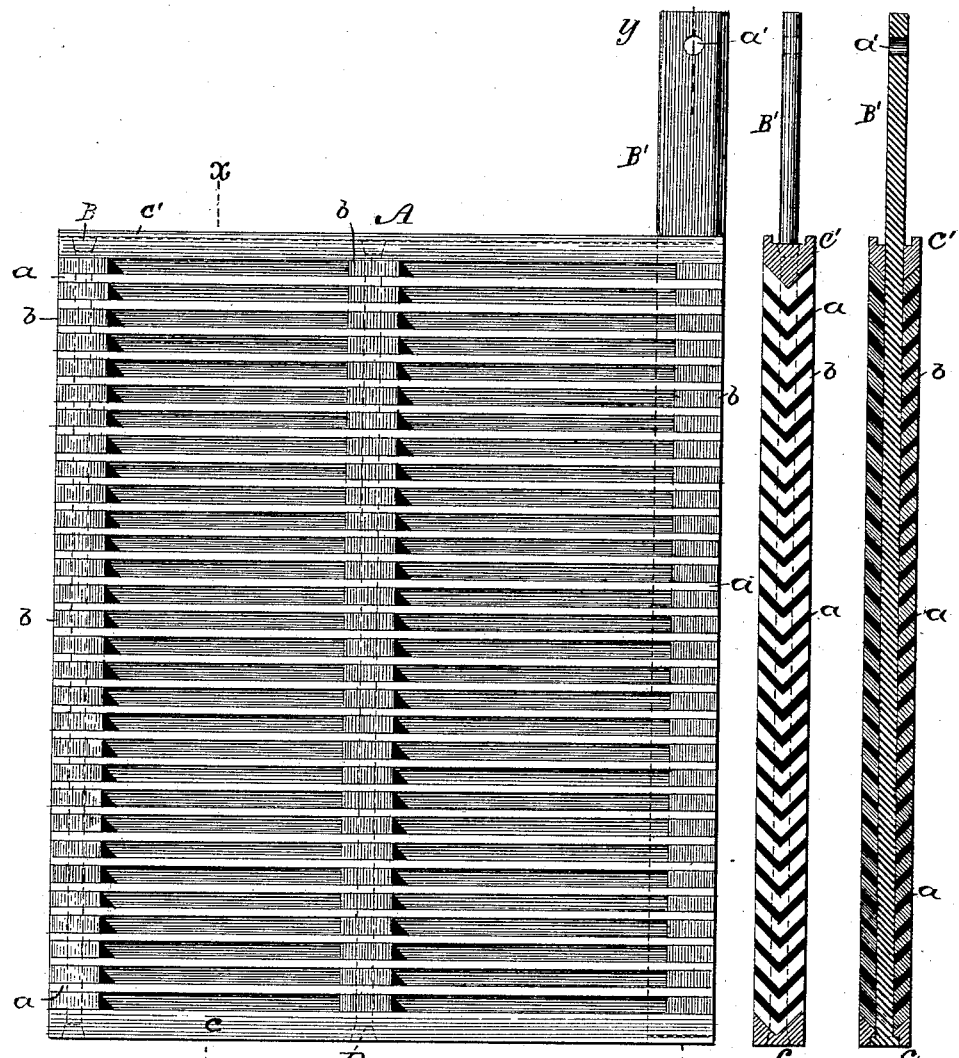
FIG. 4.
WITNESSES
Wm J. Peyton
James Young.
INVENTOR:
Eli T. Starr,
by his Attys
Baldwin, Hopkins & Peyton (No Model.) 3 Sheets—Sheet 2.

E. T. STARR.
SECONDARY BATTERY OR ELECTRIC ACCUMULATOR.

No. 314,892. Patented Mar. 31, 1885.

WITNESSES:
Wm J Peyton
James Young.

INVENTOR
Eli T. Starr,
by his Atty's
Baldwin Hopkins & Peyton (No Model.) 3 Sheets—Sheet 3.

E. T. STARR.
SECONDARY BATTERY OR ELECTRIC ACCUMULATOR.

No. 314,892. Patented Mar. 31, 1885.

WITNESSES: INVENTOR:
Wm. J. Peyton Eli T. Starr,
James Young by his attys
Baldwin, Hopkins & Peyton.

UNITED STATES PATENT OFFICE.

ELI T. STARR, OF PHILADELPHIA, PENNSYLVANIA, ASSIGNOR TO THE STARR ELECTRIC STORAGE COMPANY, OF CAMDEN, NEW JERSEY.

SECONDARY BATTERY OR ELECTRIC ACCUMULATOR.

SPECIFICATION forming part of Letters Patent No. 314,892, dated March 31, 1885.

Application filed June 2, 1884. (No model.)

*To all whom it may concern:*

Be it known that I, ELI T. STARR, of the city and county of Philadelphia, in the State of Pennsylvania, have invented certain new and useful Improvements in Secondary Batteries or Electrical Accumulators, of which the following is a specification.

My present invention relates to secondary batteries or so-called "electrical accumulators." These batteries generate no electricity of themselves, but when submitted to the action of an electric current passed through them they become charged or put into condition to generate electricity, or give off energy in the shape of electric currents. During the charging operation, or at the time the current is being passed through the battery, chemical action is being effected, and it is the chemical reaction which produces the electric current which the battery itself supplies when charged.

My improvements may be said to relate more especially to the type of secondary battery known as "Planté's"—that is, to secondary batteries the elements or electrodes of which are of lead and the electrolyte of which is dilute sulphuric acid or other suitable liquid. As will appear hereinafter, however, my improvements are not confined to batteries having lead electrodes, as any substance suitable for the purpose, and which can be so organized as to embody my improvements or any of them, is included within the scope of this invention.

The objects of my present improvements are to provide an improved secondary battery or electrical accumulator which may be comparatively rapidly and cheaply manufactured, is strong, durable, and very efficient, and may be readily taken apart and fitted together, whether for the purposes of repair or otherwise, and, finally, which may be rapidly and effectually connected up with the charging-circuit, or with the conductors of the working-circuit, or one cell or box with another.

The subject-matter claimed herein as of my invention is particularly recited at the close of the specification. I will first describe, however, all my improvements as embodied in what I at the present time consider the best way of embodying them. It should be distinctly understood, however, that some of the improvements herein claimed by me may be used without the others, and in ways not identical with that shown in the drawings and particularly described herein.

Many of the details of construction may be varied in many ways, some of which will be obvious to those skilled in the construction of electric batteries and to skillful mechanicians upon reading this specification.

Figure 6:
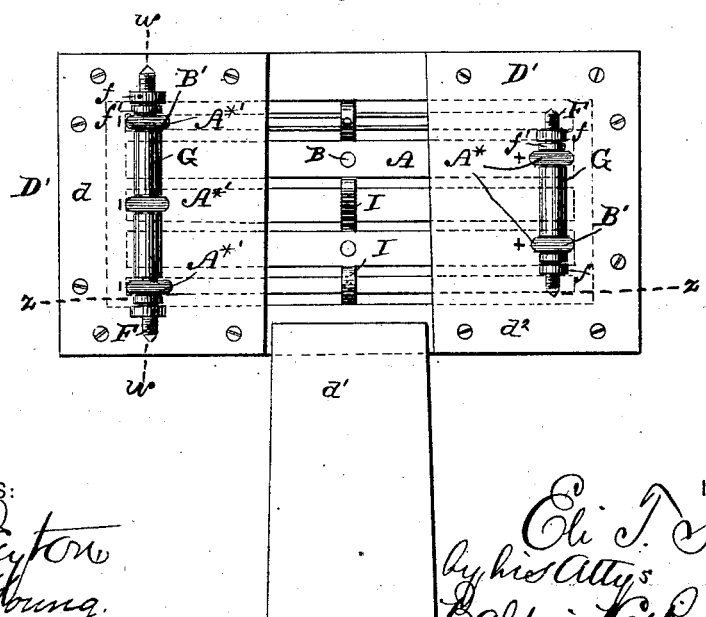
Figure 7:
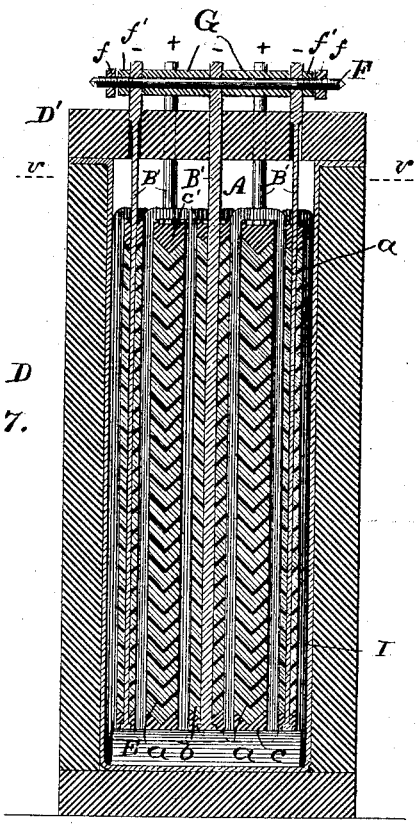
Figure 8:
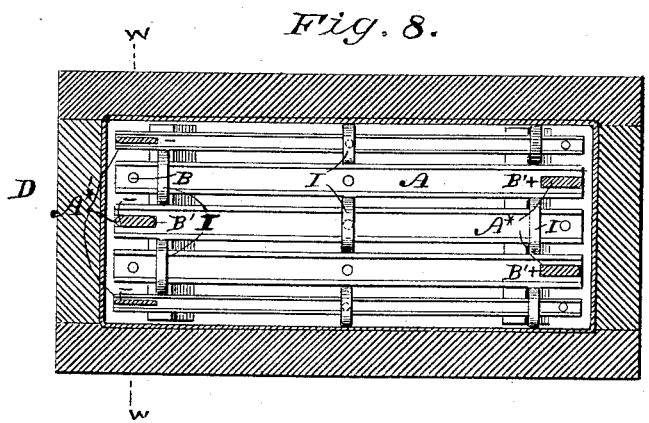

In the accompanying drawings, which form part of this specification, Figure 1 is a view in elevation of one of my improved battery plates or electrodes; and Figs. 2 and 3 are vertical sections therethrough on the line $x$ $x$ and $y$ $y$, respectively, of Fig. 1. Fig. 4 is a top or plan view of said battery plate or electrode. Fig. 5 is a longitudinal vertical section through my improved battery, taken on the line $z$ $z$ of Fig. 6; and Fig. 6 is a top or plan view thereof, with a section of the cover of the box or cell, which is readily removable, loosened and withdrawn to open the box or cell. Fig. 7 is a vertical cross-section through the improved battery on the line $w$ $w$ of Figs. 6 and 8, the section being also taken in this view through the electrodes or plates of the battery and through the connection by which the several plates constituting in this example the negative electrode are coupled up or connected together; and Fig. 8 is a horizontal section through the battery on the line $v$ $v$ of Fig. 7, showing more particularly the preferred manner of separating the several plates of the electrodes of the cell.

The battery-plates A are preferably each constructed of a series of parallel metal strips, $a$, connected together and arranged one above the other successively to the desired height. A convenient size of plate is one of ten by twelve inches, the distance between the top and bottom being the longest. Such a battery-plate thus broadly stated—to wit, one constructed of metal strips placed one above another and united together—is old; but I make use of metal strips connected together in an improved manner, and I have also improved the form or shape of the metal strips, whereby a greatly-improved battery-plate is produced. I prefer the metal strips $a$ to be bent longitudinally, so as to be substantially of a V shape, as shown in cross-section in Figs. 2, 3, and 7, and I pile these strips one above another to the desired height, and separate them by interposed separating pieces or washers b at the ends of the strips, and preferably also at the middle. The bottom or basal strip or rail, c, is preferably much heavier than the strips a, and may be flat on its lower face, or of other shape, with its upper face provided with a groove to accommodate the point of the strip a next above it. So, also, the upper strip, c', is preferably considerably heavier than the strips a making up the body of the plate, and its upper surface may be flat or grooved, as shown, while its lower face may be pointed or V-shaped to correspond with the approximate groove of the strip a immediately below it. The several strips or layers a c c' and separating pieces or washers b are preferably connected together by rods B passing through them, and riveted at their ends to the top and bottom strips or rails, c' c, the openings in the said strips or rails c' c through which the connecting-rods pass being tapered or conical, as shown, whereby when riveted down the connecting-rods B securely unite all the strips together with the separating-washers between them, the washers insuring the proper spacing or separation of the strips, so as to secure a free space preferably between each strip for the free circulation of the liquid or electrolyte of the battery between them, and to expose the entire surface of the strips to chemical action in the cells.

The strips, the washers, and the connecting-rods B are preferably of lead; but I do not limit myself to any particular kind of metal or substance, as others may be employed, although I do not believe, in the present state of the art, with the same advantage. If of lead, the strips and washers are melted together or "burned" where they join, so as to secure as near as possible perfect contact throughout and thoroughly unite the parts together.

I have described the rods B, which connect the strips and washers together by passing through them at one end and preferably at the center; but instead of a rod, B, to be riveted at the opposite end, I preferably employ a terminal strip, B', preferably also of lead, of a thickness preferably of about one-third that of the width of the lead strips or rails a c c', the ends of said strips and rails and the washers being slotted to admit the passage of the strip B' edgewise a short distance into the ends of the strips, as clearly shown in Figs. 1, 3, 4, 7, and 8. The parallel strips and washers and the flat terminal strip B', where they join, are also preferably melted together or "burned," so as to secure a firm connection and good contact, and the securing of such firm contact or connection is important, as I employ the strip B' as the terminal of the plate and extend it upwardly above the main body of the plate, in order to connect the plate with the circuit-connections, or with other plates, as shown in all the figures of the drawings.

I have described the strips a as of a substantially V shape in cross-section, with the point of the V directed downwardly. By this shape strength is secured, large surface is exposed to chemical action, and cups formed to retain and collect any metallic matter or oxide which may be detached from the under sides of the several strips.

It will be obvious that the cup shape, giving large surface and forming cups to collect matter which may be detached, can be given by other shapes than the V shape—for instance, a strip semicircular in cross-section; and, as far as concerns the first and second claims hereinafter made, flat or other shaped strips come within their scope.

In assembling the improved electrode or battery plates in the cell or box D, which contains the electrolytic fluid, (dilute sulphuric acid, for example,) and which is a preferably lead-lined box or vessel, I preferably employ two plates connected together by their terminal strips B' to form the positive (+) electrode and three plates connected together to form the negative (—) electrode, the two positive plates $A^*$ being between the two outer negative plates, $A^{*'} A^{*'}$, and alternating with the negative plates $A^{*'}$, as clearly shown in Figs. 6, 7, and 8. The outside negative plates are preferably but half the thickness of the inside negative plate and of the two positive plates.

The several plates constituting the electrodes or elements of the cell rest upon the points of inverted-V-shaped strips E E, of wood or other insulating material—for example, secured to or resting upon the bottom of the battery-box. The perfect insulation of the electrodes is thus insured. The upper ends or terminals, B', of the positive battery-plates are located at one end of the battery box or vessel D, and preferably project through openings or slots in the cover D' of said box, as shown, while the terminals B' of the negative plates are located at the opposite end of the box and project through slots or openings at that end of the cover to be connected up together. The several plates making up the positive and negative electrodes or elements are separated from each other to prevent contact and all danger of short-circuiting, preferably by means of thick rubber bands I or by suitable separating-strips.

The preferred manner of connecting the several plates of each electrode together at the outside of the box or vessel by their terminal strips is as follows: The terminal strips B' of the electrode or battery plates are provided with transverse openings a'. A connecting-bolt, F, is passed through all the terminals of the plates to be connected together to form one electrode, and through short sections of lead washers or pipe G, fitted closely in between the terminal strips B', as clearly shown in Figs. 6 and 7. The connecting-bolt F is preferably screw-threaded at each end, but not necessarily so, and is fitted with a screw nut or nuts, f, and with a washer or washers, f', for example. It will be obvious that upon tightening or screwing up the nut or nuts all the terminal strips B' will be firmly connected together and clamped upon the intermediate pipe-sections, G, and perfect contact insured between all the terminal strips, and consequently all the battery-plates which are to form one of the electrodes or elements, and this is very important. Further, it will be seen that the connection is readily detachable to permit of the separation of the parts making up the battery and the ready withdrawal of the several plates therefrom. The same detachable connection is preferably employed to connect up the plates of each electrode. By this improved connection a firm connection and secure contact may be had with the circuit-wires, or the connection between the several cells, which may be necessary to make up a battery of the required strength.

The wires used in connecting up several cells or the circuit-wires are readily and firmly connected to the terminals by placing or interposing them between, for instance, one of the washers, $f'$, and the side of one of the terminal strips B'. Upon tightening up the nut or nuts on the connecting-bolt F the wire will be sunk or partially buried in the lead terminal, and thus a perfect contact and secure connection be had. The bolt F may be a copper or brass bolt, and should be thoroughly tinned, as well as the nuts and washers thereof.

The cover or top D' of the battery box or vessel D is preferably made up of three sections, $d\ d'\ d^2$, and the sections $d\ d^2$ rigidly united to the body of the box after the electrodes are placed therein by means of detachable fastenings—screws, for example. The intermediate section, $d'$, is preferably tapered or wedge shape, and provided with beveled edges, as shown in Figs. 5 and 6, whereby it may be forced or driven into place between the other sections of the cover to close the box tightly—as for transportation, for instance—while it may be loosened and removed when the fluid is to be inserted or withdrawn or the interior of the box inspected for any reason.

The electrodes of my improved battery may be "formed" or put into condition to readily accumulate a large amount of energy, and this may be accomplished in any of the usual modes—for instance, by repeatedly charging and discharging in opposite directions, or in any other way; or I may place between the strips $a$, making up the body of the plate, active material in the shape of finely-divided strips, shavings, or pieces of lead, or other finely-divided active material, to increase the surface and the rapidity of the formation.

It will be obvious that if the finely-divided lead or lead strips, or shavings, or pieces of lead, or oxide, or other material is employed between the strips, it will be securely held by said strips, and this without the aid of cloth or felt sheets or other instrumentalities which are commonly employed where the electrode or plate has applied to it an active material not integral with or formed out of the plate.

I would have it understood, before stating my claim herein, that I am aware that two frames having bars of oval or diamond shape in cross-section set or cast therein have been arranged side by side, so that the bars of the respective frames when joined together form V-shaped receptacles for active material; but such a construction (exhibited and suggested in English Patent No. 289 of 1882) presents many disadvantages both in construction and in securing the proper contacts and connections. Such a construction is very different from the single longitudinally-bent or otherwise formed strips united together into a battery-plate as described by me.

My improved plate possesses great strength to resist contortions and changes of shape, and may be made comparatively light and cheap.

Without further elaboration of the advantages of my improvements, I will state that I claim herein as my invention—

1. A battery-plate having substantially parallel strips arranged horizontally and separated one from another by separating portions or washers, so as to form free spaces between the strips for the circulation of the battery-liquid, said strips being united together by a separate connecting rod or rods or strips passing transversely through them, substantially as described.

2. A battery-plate made up of strips having slotted ends, said strips being united together partially or wholly by a connecting strip or rod let into the slotted ends of the strips, substantially as described.

3. A battery-plate having single longitudinal strips of V or equivalent retaining form, said strips being placed one above another and rigidly united together with spaces or recesses extending transversely through the battery-plate, substantially as described.

4. A battery element or electrode made up of two or more plates the terminals of which are united together by a transverse bolt passing through them, said bolt also passing through a separate tubular conducting washer or washers or pipe-pieces interposed between the terminals of said plates, substantially as described, whereby the terminals of the plates are firmly clamped and united together and good electrical connection insured.

5. The combination, with a slotted battery-box, of electrodes or battery-plates therein, the terminals or extended portions of which plates project through a slotted cover of said box, and are connected together by a bolt passing transversely through them and through a separate intermediate conducting washer or washers or pipe-pieces, substantially as described.

In testimony whereof I have hereunto subscribed my name.

ELI T. STARR.

Witnesses:
 WM. J. PEYTON,
 E. EUGENE STARR.